Patented Feb. 17, 1953

2,628,978

UNITED STATES PATENT OFFICE 2,628,978

METHOD OF MAKING N-ARYL-4-AMINO BUTANOLS

Hilmer E. Winberg, Wilmington, Del., assignor to E. I. du Pont de Nemours & Company, Wilmington, Del., a corporation of Delaware No Drawing. Application May 17, 1949, Serial No. 93,835

2 Claims. (Cl. 260—573)

This invention relates to new chemical compounds and to methods for preparing them.

It is known to prepare 4-amino- and N-alkyl-4-amino-1-butanols by reacting 4-chlorobutanols with ammonia or the appropriate alkylamine. Attempts to extend this reaction to the preparation of N-aryl substituted 4-amino-1-butanols by reacting an arylamine, such as aniline, with 4-chlorobutanol led to the formation of tetrahydrofuran as the principal reaction product.

This invention has as an object a new class of compounds consisting of N-aryl substituted 4-amino-1-butanols. A further object is a method for the synthesis of these butanols. Other objects will appear hereinafter.

I have found that N-aryl substituted 4-amino-1-butanols can be obtained by reacting an N-aryl substituted 2,3-dihydro-1,2,6-oxazine with hydrogen in the presence of a palladium, nickel, cobalt or copper chromite hydrogenation catalyst under superatmospheric pressure at normal or elevated temperature.

In accordance with conventional nomenclature the mentioned N-aryl substituted 2,3-dihydro-1,2,6-oxazines are regarded as derived from a 2,3-dihydro-1,2,6-oxazine which is a 1,2,6-oxazine hydrogenated at the 2 and 3 positions, these positions being occupied by the nitrogen and adjacent carbon as shown in the equation given below illustrating the reaction from which the present N-aryl substituted 4-amino-1-butanols are obtained.

$$\begin{array}{c}\text{H}_2\text{C6} \quad \overset{\text{O}}{\underset{1}{\diagup}} \quad 2\text{N—R} \\ | \qquad \qquad | \\ \text{HC5} \quad 3\text{CH}_2 \\ \quad \diagdown \underset{\text{CH}}{4} \diagup \end{array} \xrightarrow[\text{Catalyst}]{\text{H}_2} \text{R.NH.CH}_2.\text{CH}_2.\text{CH}_2.\text{CH}_2\text{OH}$$

in which R is aryl.

The following general description illustrates one manner of practicing this invention.

A pressure resistant reaction vessel is charged with the N-aryl substituted 2,3-dihydro-1,2,6-oxazine, hydrogenation catalyst, and an inert reaction medium, such as methanol, and the vessel is closed. The reactor is so arranged that the reaction mixture can be heated and agitated and is connected to a source of high pressure hydrogen. Hydrogen is expanded into the reactor to a pressure of at least 50 pounds/sq. in. and the reaction mixture heated to between 25° and 150° C. Reaction is indicated by a pressure drop. The selected pressure and temperature conditions are maintained until there is no further pressure drop. At the end of the reaction, the reactor is allowed to cool, purged of excess hydrogen, opened, the contents discharged, and the catalyst removed by filtration. The filtrate is then subjected to vacuum distillation to remove the reaction medium and isolate the desired N-aryl substituted 4-amino-1-butanol.

The examples which follow are submitted to illustrate and not to limit this invention. Parts are by weight, unless otherwise stated.

Example I

A pressure resistant reactor provided with a shaker attachment was charged with a solution of 16.1 parts of 2-phenyl-2,3-dihydro-1,2,6-oxazine dissolved in 103 parts of purified dioxane. One part of 10% palladium-on-carbon catalyst was added and the vessel was closed. Hydrogen at 1500 lbs./sq. in. was expanded into the reactor and shaking started. The exothermic reaction caused the temperature to rise to 50° C. After one hour, hydrogen absorption ceased and the reaction was complete. The excess hydrogen was purged from the reactor, the solution removed, and the catalyst separated by filtration. Removal of the solvent under vacuum from the filtrate left an oily residue which on distillation gave 10.2 parts (62% theory) of N-phenyl-4-amino-1-butanol as a colorless, viscous oil, boiling at 150 to 151° C./1.5 mm., $n_D^{25}$ 1.5613, $d_{25}^{25}$ 1.0514

Anal. calcd. for $C_{10}H_{15}ON$:
C, 72.69; H, 9.15; N, 8.48; MR 50.99.
Found:
C, 72.55, 72.01, 72.36; H, 9.16, 9.46, 9.58; N, 8.89, 8.53; MR 50.92.

Example II

A solution of 42.0 parts of 2-(o-tolyl) 2,3-dihydro-1,2,6-oxazine in 130 parts of purified dioxane was charged into the apparatus employed in Experiment I, and after the addition of 2 parts of 10% palladium-on-carbon catalyst, the mixture was hydrogenated at 1500 to 2000 lbs./sq. in. and a temperature ranging from room temperature to 50° C. After one hour, hydrogen absorption had ceased. The reactor was then allowed to cool, opened, and the contents discharged. Removal of the catalyst by filtration, and distillation of the filtrate gave 31.0 parts (72% theory) of N-(o-tolyl) 4-aminobutanol as a clear, odorless, oily liquid boiling at 143–144°/1.4 mm., $n_D^{25}$ 1.5549.

Anal. calcd. for $C_{11}H_{17}ON$:
C, 73.70; H, 9.56; N, 7.82.
Found:
C, 73.83, 73.41, 73.70; H, 9.60, 9.42, 9.79; N, 7.57, 7.46.

Example III

A mixture comprising 13.7 parts of 2-(p-tolyl)-2,3-dihydro-1,2,6-oxazine, 113 parts of purified ethyl acetate and 1 part of 10% palladium-oncarbon was treated with hydrogen at 1500 lbs./sq. in. and 50° C. for one hour, after which time no further absorption of hydrogen occurred. The reactor was then permitted to cool, opened, and discharged. The reaction mixture was filtered and the filtrate subjected to distillation. There was collected 2.6 parts (19% theory) of viscous oil boiling at 126–128° C./0.3 mm. This N-(p-tolyl) 4-aminobutanol crystallized to a white waxy solid melting at 48–51° C.

Anal. calcd. for $C_{11}H_{17}ON$:
C, 73.70; H, 9.56; N, 7.82.
Found:
C, 73.74, 73.44; H, 9.53, 9.36; N, 7.82, 7.61.

*Example IV*

A solution comprising 32.2 parts of 2-phenyl-2,3 dihydro-1,2,6-oxazine in 97 parts of purified dioxane was charged into the apparatus employed in Example I, and after the addition of 1.5 g. of moist Raney nickel catalyst, the mixture was hydrogenated at 1500 lbs./sq. in. and a temperature ranging from 50 to 70° C. When hydrogen absorption had ceased, the reactor was allowed to cool, opened, and the contents discharged. Removal of the catalyst by filtration and distillation of the filtrate gave 23.5 parts (71% theory) of N-phenyl-4-amino-1-butanol boiling at 119–121° C./0.30 mm.

*Example V*

A mixture comprising 32.2 parts of 2-phenyl-2,3-dihydro-1,2,6-oxazine, 97 parts of purified dioxane and 3 parts of copper chromite catalyst was treated with hydrogen at 1500 lbs./sq. in. and 125° C. until the absorption of hydrogen ceased. The reactor was then cooled, opened, and the contents discharged. The reaction mixture was filtered and filtrate subjected to distillation. There was obtained 20.1 parts (61% theory) of N-phenyl-4-amino-1-butanol boiling at 117–121° C./0.30 mm.

Although in the examples certain definite conditions of temperature, pressure, concentration, duration of reaction, catalyst concentrations, etc., are employed, it is to be understood that these are interdependent variables and that variation in one necessitates compensating adjustments in the others.

The hydrogenation of the N-aryl-substituted 2,3-dihydro-1,2,6-oxazines to produce the N-aryl substituted 4-amino-1-butanols of this invention can be effected at temperatures in the range of 20° to 200° C. Generally the hydrogenation is effected within the range of 25° to 150° C. because under these conditions the best yields of desired product, at a practical rate of reaction, are obtained.

The hydrogenation is effected under hydrogen pressures in excess of 50 pounds/sq. in. As a rule pressures in the range of 500 to 3,000 pounds/sq. in. are employed because within this range best reaction rates and yields of desired N-aryl substituted 4-amino-1-butanols are obtained.

As has been noted, the catalyst employed in the hydrogenation of the N-aryl substituted-2,3-dihydro-1,2,6-oxazines to the N-aryl substituted 4-amino-1-butanols of this invention is selected from the group of palladium, nickel, cobalt or copper chromite hydrogenation catalysts. The palladium, nickel or cobalt may be employed in the elementary stage or they may be employed in the form of their oxides or salts. These may be supported on such suitable extenders as charcoal, pumice, kieselguhr, barium sulfate, barium carbonate, alumina, etc., or they may be unsupported.

Palladium, because of its activity at relatively low temperatures and because of its high degree of selectivity is a particularly useful catalyst in the preparation of the N-aryl substituted 4-amino-1-butanols of this invention. A typical preparation of such a catalyst is the following:

A solution of 8.33 grams of palladium chloride in 5.5 ml. of concentrated hydrochloric acid and 40 ml. of water is prepared by heating the mixture on a steam bath. The resulting solution is poured into a solution of 135 grams of sodium acetate trihydrate in 500 ml. of water contained in a 1-liter reduction bottle. Forty-five grams of activated carbon is added and the mixture hydrogenated until hydrogen absorption ceases, which is between 1 and 2 hours. The catalyst is collected on a suction filter and washed with 2 liters of water in 5 portions. The filter cake, after removal of most of the water, is dried in air and stored in a desiccator over calcium chloride. The catalyst, which weighs from 40 to 50 grams and contains about 10% palladium, is stored, after being powdered, in a tightly closed container.

Cobalt and nickel in the form of stabilized or pyrophoric metals or in the form of their oxides and salts are useful catalysts in preparation of the N-aryl substituted 4-amino-1-butanols of this invention. Elementary nickel and cobalt catalysts in the pyrophoric state may be prepared by methods yielding the active form of the metals at temperatures below 150° C. or by reducing a salt, oxide or hydroxide of cobalt or nickel with hydrogen at temperatures in the range of 400° to 700° C. These pyrophoric metals may be stabilized by exposure to an oxidizing atmosphere under conditions such that the temperature of the catalyst mass is maintained below 50° C.

Pyrophoric nickel and cobalt catalysts may be conveniently made by extracting with alkali the alkali soluble component of an alloy of nickel or cobalt with an alkali soluble metal or by reducing nickel or cobalt salts with sodium naphthalene as described in U. S. Patent 2,177,412. The nickel and cobalt catalysts may be supported or unsupported. The support may be added during catalyst preparation or it may be formed in preparation. The preparation of nickel and cobalt catalysts is illustrated below.

*Preparation of nickel catalyst*

Three hundred parts of a finely divided alloy composed of equal parts of nickel and aluminum is added with stirring over a period of one and one half hours to a solution of 342 parts of sodium hydroxide in 1590 parts of distilled water maintained at 50° C. The supernatant liquid is then decanted off and the catalyst washed with distilled water until it is free from alkali.

*Preparation of cobalt catalyst*

One hundred parts of finely ground cobalt-aluminum alloy containing equal parts of cobalt and aluminum is suspended with stirring in 1250 parts of boiling water. A solution of 60 parts of sodium hydroxide in 175 parts of distilled water is added during 2 hours. Thereafter the mixture is boiled for 4 hours. The resultant finely divided product is washed with distilled water by decantation until it is free from alkali. The product is pyrophoric and it may be stabilized as follows:

The aqueous sludge of the product is placed in a rotating vessel. The vessel is sealed, the air is exhausted by means of a vacuum pump, and the mass heated under vacuum until all the free water is removed. The vessel is then cooled continuously with cold water and a small amount of air is blown through the dry mass at such a rate that the temperature of the dry mass does not exceed 50° C. After 2 hours a sample of the dry product is no longer pyrophoric. The catalyst is found by analysis to consist of 37% cobalt, of which 55% is in the elementary state, and 43% $Al_2O_3$. The catalyst therefore probably consists of partially oxidized cobalt supported on alumina.

Catalysts containing copper chromite as an essential component are prepared by heating a double chromate of copper and a nitrogen base to its spontaneous decomposition temperature, as described in U. S. Patents 1,746,783, 1,964,001, 2,066,153, and 2,137,407.

The amount of hydrogenation catalyst employed in the hydrogenation of the N-aryl substituted 2,3-dihydro-1,2,6-oxazines to produce the N-aryl substituted 4-amino-1-butanols of this invention is generally from 0.01 to 15% by weight of the N-aryl substituted 2,3-dihydro-1,2,6-oxazine. As a rule, however, from 1.0 to 10% of catalyst is used because with such amounts satisfactory rates of reaction together with good yields of desired product are obtained.

Although the examples illustrate hydrogenation by batch operation in the liquid phase it is to be understood that the hydrogenation can also be effected satisfactorily as a semi-continuous or continuous operation in the liquid or vapor phase. In continuous operation the ratio of catalyst to oxazine is much higher than indicated in the previous paragraph for the batch process.

Generally, the hydrogenation is effected in the presence of an inert reaction medium because the reaction is exothermic and the medium aids in the dissipation of the heat of reaction, thus making it easier to control the reaction temperature. Suitable media are water, dioxane, ethyl acetate, cyclohexane, alcohols, ethers, and the like.

The N-aryl substituted 2,3-dihydro-1,2-6-oxazines hydrogenated to produce the N-aryl substituted 4-amino-1-butanols of this invention are the products obtained by reacting 1,3- butadiene with an aromatic nitroso compound, as described in Akad. Nauk. S. S. S. R. Doklady 60, 117–6 (1948) and ibid 60 993–6 (1948).

Examples of N-aryl substituted 2,3-dihydro-1,2,6-oxazines usefully employable for producing the N-aryl substituted 4-amino-1-butanols of this invention are 2-phenyl-2,3-dihydro-1,2,6-oxazine, 2-tolyl-2,3-dihydro-1,2,6-oxazine, 2-(3',4' - dimethylphenyl) - 2,3-dihydro-1,2,6-oxazine, 2-(4'-isopropylphenyl) -2,3-dihydro - 1,2,6-oxazine, 2-(2'-formylphenyl) -2,3-dihydro-1,2,6-oxazine, 2-(2'-carboxyphenyl) -2,3-dihydro-1,2,6-oxazine, 2-(4' - methoxyphenyl) - 2,3 - dihydro-1,2,6-oxazine, 2-(4'-nitrophenyl) -2,3 - dihydro-1,2,6-oxazine, 2(1'-naphthyl) -2,3-dihydro-1,2,6-oxazine and the like. From these compounds there are obtained N-phenyl-4-amino-1-butanol, N-toyl-4-amino - 1 - butanol, N-3'-4'-dimethylphenyl -4- amino -1- butanol, N-4'-isopropyl phenyl-4-amino-1-butanol, N-2'-hydroxymethyl-phenyl-4-amino-1-butanol, N-2'-carboxyphenyl-4-amino -1- butanol, N -4'- methoxyphenyl-4-amino-1-butanol, N-4'-aminophenyl-4-amino-1-butanol, and N-1'-naphthyl-4-amino-1-butanol.

The aryl substituent on the nitrogen atom of the 2,3-dihydro-1,2,6-oxazines, and hence on the nitrogen of the resulting butanol, can be either mono or polynuclear. In so far as I have been able to determine the reaction illustrated herein takes place in all instances in which the nitrogen atom of the 2,3-dihydro-1,2,6-oxazines is attached to aryl carbon irrespective of substituents carried by the aryl group.

The N-aryl substituted 4-amino-1-butanols of this invention are useful for the preparation of esters finding application as solvents and plasticizers, as components of brake fluids, etc. and as intermediates in the synthesis of dyes.

As many apparently widely different embodiments of this invention may be made without departing from the spirit and scope thereof, it is to be understood that this invention is not limited to the specific embodiments thereof except as defined in the appended claims.

I claim:
1. A process for obtaining N-aryl substituted 4-amino-1-butanols wherein said aryl radical is from the group consisting of unsubstituted phenyl and naphthyl radicals and phenyl and naphthyl radicals substituted by lower alkyl, lower alkoxy, lower hydroxyalkyl, hydroxy, carboxy, amino, and formyl radicals which comprises hydrogenating at a temperature of 20° C.–200° C. and a pressure in excess of 50 lbs./sq. in. an N-aryl substituted 2,3 - dihydro - 1,2,6 - oxazine wherein said aryl radical is from the group consisting of unsubstituted phenyl and naphthyl radicals and phenyl and naphthyl radicals substituted by lower alkyl, lower alkoxy, lower hydroxyalkyl, hydroxy, carboxy, amino, and formyl radicals, in contact with a hydrogenation catalyst selected from the group consisting of palladium, nickel, cobalt, and copper chromite hydrogenation catalysts.

2. Process as set forth in claim 1 wherein said hydrogenating is carried out at a temperature of 25° C.–150° C. and a pressure of 500–3000 lbs./sq. in.

HILMER E. WINBERG.

REFERENCES CITED

The following references are of record in the file of this patent:

UNITED STATES PATENTS

| Number | Name | Date |
|---|---|---|
| 1,631,947 | Bruson | June 7, 1927 |
| 2,194,294 | Cass et al. | Mar. 19, 1940 |
| 2,194,314 | Maxwell | Mar. 19, 1940 |
| 2,275,470 | Ruark | Mar. 10, 1942 |
| 2,474,792 | Senkus | June 28, 1949 |

FOREIGN PATENTS

| Number | Country | Date |
|---|---|---|
| 313,617 | Great Britain | July 24, 1930 |

OTHER REFERENCES

Warkwalter: Chem. Abstr., vol. 1, col. 2477[6] (1907).

Arbuzou et al.: Chem. Abstr., vol. 42, col. 7299–7300 (1948).

Hromatka: Berichte, vol. 75B, page 381 (1942).

Scriabine: Bull. Soc. Chim., France, 1947, pages 454–456.